US009467233B1

(12) United States Patent
Lentine et al.

(10) Patent No.: US 9,467,233 B1
(45) Date of Patent: Oct. 11, 2016

(54) POWER METER RATIO METHOD OF STABILIZING A RESONANT MODULATOR

(71) Applicant: Sandia Corporation, Albuquerque, NM (US)

(72) Inventors: Anthony L. Lentine, Albuquerque, NM (US); Jonathan Albert Cox, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 207 days.

(21) Appl. No.: 14/462,416

(22) Filed: Aug. 18, 2014

(51) Int. Cl.
*H04B 10/516* (2013.01)
*H04B 10/564* (2013.01)
*H04B 10/079* (2013.01)

(52) U.S. Cl.
CPC ...... *H04B 10/564* (2013.01); *H04B 10/07955* (2013.01); *H04B 10/516* (2013.01)

(58) Field of Classification Search
CPC .......... H04B 10/564; H04B 10/07955; H04B 10/516
USPC .......................................................... 398/38
See application file for complete search history.

(56) References Cited

U.S. PATENT DOCUMENTS

| 8,615,173 | B1 | 12/2013 | Lentine et al. | |
|---|---|---|---|---|
| 9,083,460 | B1* | 7/2015 | Zortman | H04B 10/50575 |
| 2003/0091116 | A1* | 5/2003 | Yap | H03M 3/47 375/247 |
| 2006/0034616 | A1* | 2/2006 | Tipper | G02F 1/0123 398/186 |
| 2006/0083144 | A1* | 4/2006 | Piede | G02F 1/025 369/100 |
| 2010/0200733 | A1* | 8/2010 | McLaren | G02B 6/12007 250/214 C |
| 2014/0169724 | A1* | 6/2014 | Ingels | G02F 1/29 385/9 |
| 2014/0299751 | A1* | 10/2014 | Tang | G01J 1/0425 250/227.11 |
| 2015/0160482 | A1* | 6/2015 | Amberg | G02F 1/0147 385/1 |
| 2015/0263190 | A1* | 9/2015 | Knights | G02F 1/011 250/201.1 |

OTHER PUBLICATIONS

Cox et al., "Control of integrated micro-resonator wavelength via balanced homodyne locking", Optics Express, vol. 22, No. 9, May 5, 2014, pp. 11279-11289.
Derose et al., "Silicon Microring Modulator with Integrated Heater and Temperature Sensor for Thermal Control", IEEE (2010) pp. 1-2.
Padmaraju et al., "Thermal Stabilization of a microring modulator using feedback control", Optics Express, vol. 20, No. 27, Dec. 17, 2012, pp. 27999-28008.
Padmaraju et al., "Wavelength Locking and Thermally Stabilizing Microring Resonators Using Dithering Signals", Journal of Lightwave Technology, vol. 32, No. 3, Feb. 1, 2014, pp. 505-512.

(Continued)

*Primary Examiner* — Dalzid Singh
(74) *Attorney, Agent, or Firm* — Martin I. Finston (57) ABSTRACT

Methods and systems for stabilizing a resonant modulator include receiving pre-modulation and post-modulation portions of a carrier signal, determining the average power from these portions, comparing an average input power to the average output power, and operating a heater coupled to the modulator based on the comparison. One system includes a pair of input structures, one or more processing elements, a comparator, and a control element. The input structures are configured to extract pre-modulation and post-modulation portions of a carrier signal. The processing elements are configured to determine average powers from the extracted portions. The comparator is configured to compare the average input power and the average output power. The control element operates a heater coupled to the modulator based on the comparison.

20 Claims, 3 Drawing Sheets

(56) References Cited

OTHER PUBLICATIONS

Timurdogan et al., "Automated Wavelength Recover for Microring Rsonators", CLEO Technical Digest (2012) pp. 1-2.
U.S. Appl. No. 13/871,887, "Systems and Methods for Controlling an Operating Wavelength", filed Apr. 26, 2013, pp. 1-29.
Zheng et al., A High-speed, tunable silicon photonic ring modulator integrated with ultra-efficient active wavelength control, Optics Express, vol. 22, No. 10, May 19, 2014, pp. 12628-12633.
Zortman et al., "Bit-Error-Rate Monitoring for Active Wavelength Control of Resonant Modulators", IEEE Computer Society (2013) pp. 42-52.

* cited by examiner

POWER METER RATIO METHOD OF STABILIZING A RESONANT MODULATOR

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

CROSS-REFERENCE TO RELATED APPLICATION

The subject matter of this application is related to the subject matter of the co-pending and commonly owned U.S. patent application Ser. No. 14/502,062, which was filed on Sep. 30, 2014 by William A. Zortman et al. under the title, "Integrated Unaligned Resonant Modulator Tuning".

FIELD OF THE INVENTION

The invention relates generally to resonant modulators, and more particularly, to methods for stabilizing resonant modulators.

BACKGROUND OF THE INVENTION

In typical signal transmission applications, a carrier signal is modulated with a stream of data consisting of the information to be transmitted. When the transmission employs optical carrier signals (such as a beam of light), an optical modulator is used. One class of optical modulators, referred to herein as resonant modulators, operates by modulating an optical signal while that signal resonates within a body of the modulator. Such resonant modulators, however, may experience changes in temperature over the course of their operation that diminish the effectiveness of the modulator (e.g., by changing the resonant frequency and/or switching voltage of the modulator). Accordingly, improvements are desired for maintaining the effectiveness of resonant modulators.

SUMMARY OF THE INVENTION

Aspects of the present invention are directed to methods and systems for stabilizing a resonant modulator.

In accordance with one aspect of the present invention, a method for stabilizing a resonant modulator is disclosed. The method includes receiving a first portion of a carrier signal to be input to the resonant modulator, receiving a second portion of the carrier signal after the carrier signal has been modulated by the resonant modulator, determining an average input power from the first portion of the carrier signal, determining an average output power from the second portion of the carrier signal, comparing the average input power and the average output power, and operating a heater coupled to the resonant modulator based on the comparison of the average input power and the average output power.

In accordance with another aspect of the present invention, a system for stabilizing a resonant modulator is disclosed. The system includes a pair of input structures, one or more processing elements, a comparator, and a control element. The first input structure is configured to extract a first portion of a carrier signal to be input to the resonant modulator. The second input structure is configured to extract a second portion of the carrier signal after the carrier signal has been modulated by the resonant modulator. The processing elements are configured to determine an average input power from the first portion of the carrier signal and an average output power from the second portion of the carrier signal. The comparator is configured to compare the average input power and the average output power. The control element is configured to operate a heater coupled to the resonant modulator based on the comparison of the average input power and the average output power.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The exemplary systems and methods described herein are usable to stabilize (or control) resonant modulators in optical transmission systems. In general, the disclosed embodiments compare power from a carrier signal to be transmitted before and after the carrier signal has been modulated. The difference between the ratio of pre-modulation power to the post-modulation power and a predetermined ratio is used to control a temperature of the resonant modulator.

Figure 1:
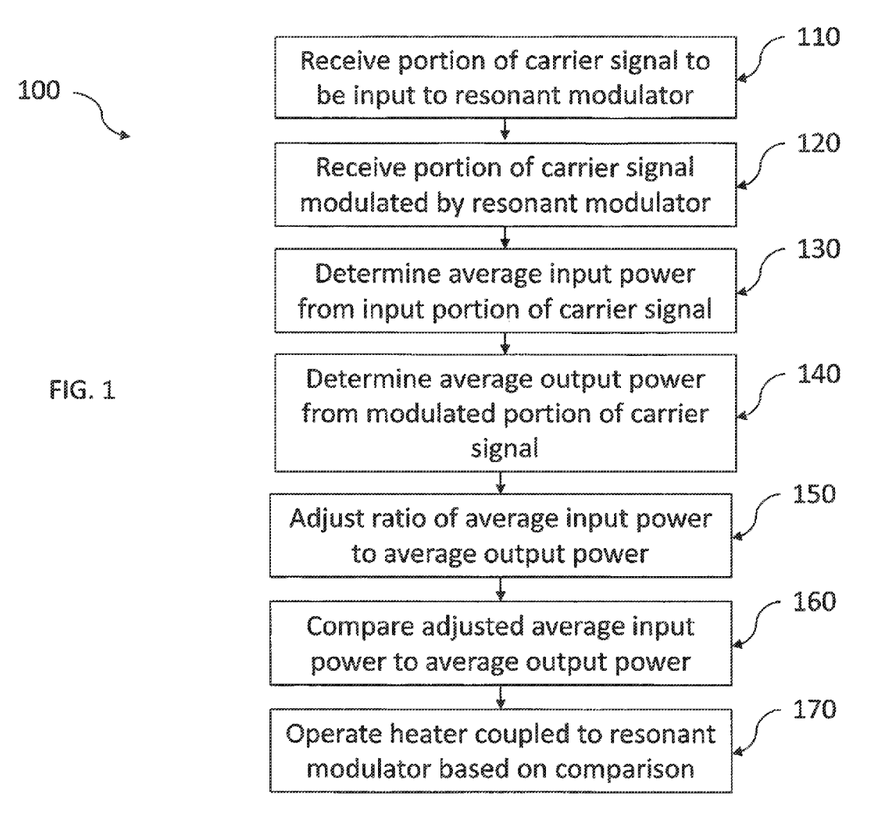
FIG. 1 is a flowchart illustrating an exemplary method for stabilizing a resonant modulator in accordance with aspects of the present invention.

Referring now to the drawings, FIG. 1 illustrates an exemplary method 100 for stabilizing a resonant modulator in accordance with aspects of the present invention. Method 100 is usable for controlling resonant modulators such as ring or disc modulators. As a general overview, method 100 includes receiving a pre-modulation carrier signal, receiving a post-modulation carrier signal, determining average powers of the signals, adjusting one of the average power signals, comparing the adjusted average power signal to the other average power signal and operating a heater. Additional details of method 100 are described below.

In step 110, a first portion of an optical carrier signal is received. The first portion of the carrier signal is obtained before the carrier signal is modulated by the resonant modulator. The carrier signal may be any suitable optical carrier signal. The portion of the carrier signal may comprise a predetermined amount of the carrier signal. In an exemplary embodiment, the portion of the carrier signal is extracted from the input waveguide of the resonant modulator. Suitable structures for obtaining a portion of a carrier signal will be described below, and will be known to one of ordinary skill in the art from the description herein.

In step 120, a second portion of a carrier signal is received. The second portion of the carrier signal is obtained after the carrier signal has been modulated by the resonant modulator to be stabilized by method 100. The resonant modulator modulates the carrier signal by varying a property (e.g. amplitude) of the carrier signal based on whether each bit in the stream of data is high or low. As set forth above, in an exemplary embodiment, the resonant modulator may be a ring modulator or a disc modulator. Other suitable modulators for use with method 100 will be known to one of ordinary skill from the description herein.

Preferably, the first and second portions of the carrier signal are continuous wave signals, which can be processed to determine average power (as set forth below) with a finite bandwidth. Where the first and second portions are obtained for a limited duration, the second portion of the carrier signal is desirably the same duration as the first portion of the carrier signal. In an exemplary embodiment, the portion of the carrier signal is extracted from the output waveguide of the resonant modulator. The same types of structures used to obtain a portion of the carrier signal in step 110 may also be used to obtain the portion of the modulated carrier signal in step 120. As described below, however, the structures may be configured to obtain different percentages of their respective signals so that the amplitudes of the extracted input and output signals are comparable.

In step 130, an average power of the first portion of the carrier signal is determined. The term "average power" used herein is not intended to limit the determination to a true mean of the power of the carrier signal. To the contrary, as used herein, the determination of "average power" is intended to encompass a range of values that are derived from or representative of the power of the carrier signal over a period of time. An example of the determination of average power is provided below for the purpose of illustration.

In an exemplary embodiment, the first portion of the carrier signal is extracted from the input line of the resonant modulator in order to determine an average input power for the signal. Prior to processing the first portion of the optical carrier signal, the optical signal is converted to an electrical signal. Accordingly, step 130 may further include the sub-step of converting the first portion of the carrier signal into an electrical signal. Suitable structures for converting an optical signal to an electrical signal include photodiodes or phototransistors. Other suitable structures will be known to one of ordinary skill in the art from the description herein.

After it is converted into an electrical signal, the first portion of the carrier signal is then provided as input to a low-pass filter circuit. The first portion of the carrier signal is filtered to determine the average input power for the signal. The frequency of the low-pass filter may be selected to be substantially lower than the frequency of the optical carrier signal. In an exemplary embodiment, the low pass filter has a cutoff frequency of 25 KHz It is contemplated, however, that the cutoff frequencies of the low-pass filters may be in a range between 10 KHz and 50 KHz.

In step 140, an average power of the second portion of the carrier signal is determined. The determination of average power of the second portion of the carrier signal is made using the same process as is used to determine the average power of the first portion.

In step 150, the ratio of the average input power to the average output power is adjusted. In some embodiments of method 100, the average input power may be attenuated to compensate for an inherent loss of power of the carrier signal during modulation of the carrier signal by the resonant modulator. The carrier signal is modulated by switching the resonant modulator on and off. This reduces the power of the carrier signal when the modulator is turned on, and does not affect (or only minimally affects) the power of the carrier signal when the modulator is turned off. Thus, as long as the carrier is being modulated, the average output power will always be lower than the average input power.

In an exemplary embodiment, the adjustment of the ratio of average input power to average output power comprises lowering the average input power by a predetermined percent of its total. The amount by which the average input power signal is to be attenuated can be determined based on the design of the modulator, and more particularly, based on an amount of the expected power loss caused by the modulator during modulation of the carrier signal (which may take into account the duty cycle of the modulating signal). The attenuation of the average input power signal may be implemented in a number of ways. It may be implemented, for example, by reducing the percentage of the signal that is extracted from the input carrier signal relative to the percentage of the output carrier signal that is extracted.

Alternatively, the extracted input signal may be optically attenuated before its average power is determined. The extracted input signal may be attenuated before, during, or after the electrical signal processing that calculates the average power in the input signal.

In another alternative, the extracted input signal is not attenuated. Instead, the power ratio between the input and output signals is adjusted by optically or electrically amplifying the output signal. The amplification may take place before, during, or after the electrical signal processing that calculates the average output signal power.

In still another embodiment, no adjustment of the average input power or average output power is made. In this embodiment, the average output power will always be lower than the average input power, as long as the carrier is being modulated, The extent of the difference between the average input and output powers can be determined based on the modulator's design and modulation duty cycle, and this known difference can be considered when comparing the average powers.

The remaining steps of method 100 are described below with respect to the embodiment in which the average input power is adjusted prior to the comparison.

In step 160, the adjusted average input power is compared to the average output power. In an exemplary embodiment, the adjusted average power of the first portion of the carrier signal is compared to the average power of the second (modulated) portion of the carrier signal with a comparator. A difference between the adjusted average input power and the average output power is output by the comparator.

In step 170, a heater is operated based on the comparison of the adjusted average input power and the average output power. The heater is coupled to the resonant modulator in order to maintain a desired resonant characteristic of the resonant modulator during operation. When the system includes a plurality of modulators, it is desirable that each modulator be associated with its own distinct heater. Additionally, the plurality of modulators may be coupled to a cooling device (such as a thermo-electric cooler, not shown) to adjust the temperatures of the plurality of modulators so that the heater can be most effective.

The ratio of the average input power to the average output power controls the output of the comparator. Accordingly, the operation of the heater operation is dependent on the ratio of the average input power to the average output power. The ratio of the average input power to the average output power can be changed by adjusting (e.g., amplifying or attenuating) the average input power or the average output power, as described above with respect to step 150. In an exemplary embodiment, one of these powers is adjusted such that the average input and output powers are equal to each other when the modulator is working properly (or in other words, when the average input power is adjusted, the ratio of average output power to adjusted average input power is effectively 1:1). In this embodiment, when the average output power differs from the adjusted average input power, it serves as an indicator that the modulator is not working properly (e.g., the modulator is not fully modulating the carrier signal).

In accordance with aspects of the present invention, improper function of the modulator (as determined by processing of the average power of the carrier signal) may be presumed to be caused (at least in part) by temperature drift of the modulator. Temperature drift can change the resonant frequency of the modulator. This, in turn, might inhibit the optical carrier signal from resonating in the modulator and as a consequence might prevent it from being effectively modulated. Additionally, the switching voltage of the modulator may be affected by changes in temperature of the modulator, which may prevent the modulator from properly modulating the optical carrier signal.

Accordingly, when the average output power is greater than the adjusted average input power, it may be determined that the modulator temperature has drifted downward, and the heater is turned on to correct the temperature drift. Conversely, when the average output power is less than the adjusted average input power, it may be determined that the modulator temperature has drifted upward, and the heater is turned off to allow the modulator temperature to return to a desired level. This operation may be referred to as "sidelocking"; that is, the average power level is on the side of the "average" resonance. There may be a finite range over which the above-described operation is appropriate. For example, if a large, fast variation moves the operating point to the other side of the resonance, then the control circuit may be reset so that the above directionality can be applicable.

Figure 3A:
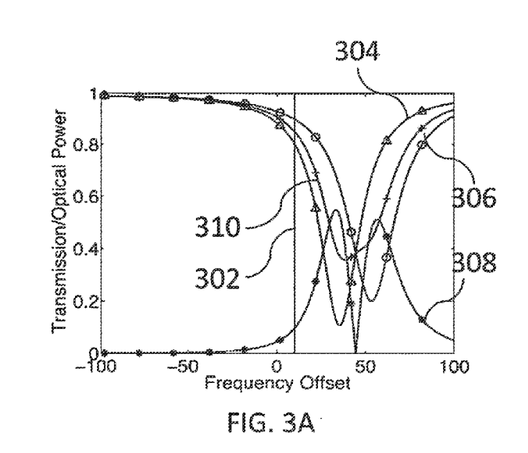
FIGS. 3A-3D are graphs illustrating the effect that changes in temperature have on signal transmission for an exemplary resonant modulator in accordance with aspects of the present invention.
Figure 3B:
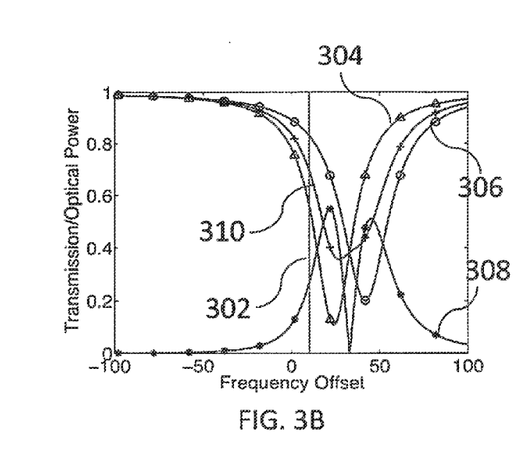
Figure 3C:
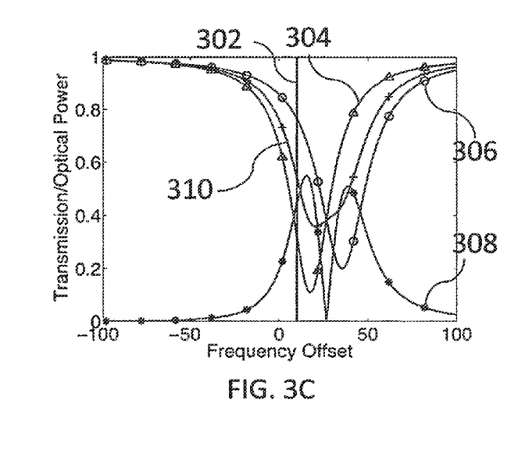
Figure 3D:
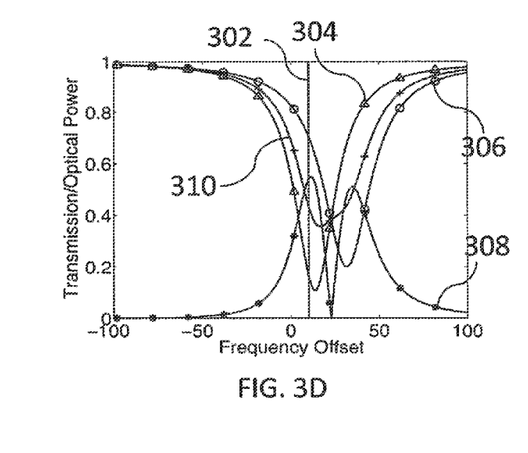

More specifically, FIGS. 3A-3D (which are discussed in greater detail below) show resonance curves in which the normalized average output power 310 is plotted versus frequency offset of the resonance. FIGS. 3A to 3D show increasing temperatures, with FIG. 3D showing a temperature near optimum. Optimum operation is obtained by maximizing the differential transmission, i.e. the difference between a logic one (304) and logic zero (306), as represented in the figure by curve 308. This occurs when the laser line (302) is shown to intersect the average output power on the left side of the resonance at a specific value corresponding to the intersection of those lines in FIG. 3D.

The effect of cooling (moving from 3D to 3A) is to shift the center frequency of the resonance to the right, which increases the separation between the operating point and the center frequency, consequently reducing the modulation depth. Heating beyond the optimum (not shown, but easily envisioned by shifting the curves far to the left), will also decrease the modulation depth, eventually passing through zero before inverting the modulation. If the system enters that state, it should be reset to allow normal operation of the control loop to continue.

In an exemplary embodiment, the actual difference between the adjusted average input power and the average output power is used to control the heater. In this embodiment, the actual difference between the adjusted average input power and the average output power is provided as input to an integrator circuit. This difference is integrated to obtain a control signal for controlling the heater. The control signal is then applied as a control input to the heater.

The operation of the heater described above in step 170 is preferably performed continuously during operation of the transmission system. During operation of the resonant modulator, the heater can be periodically adjusted when errors in modulator operation are detected through monitoring of the average power of the carrier signal described above.

Figure 2:
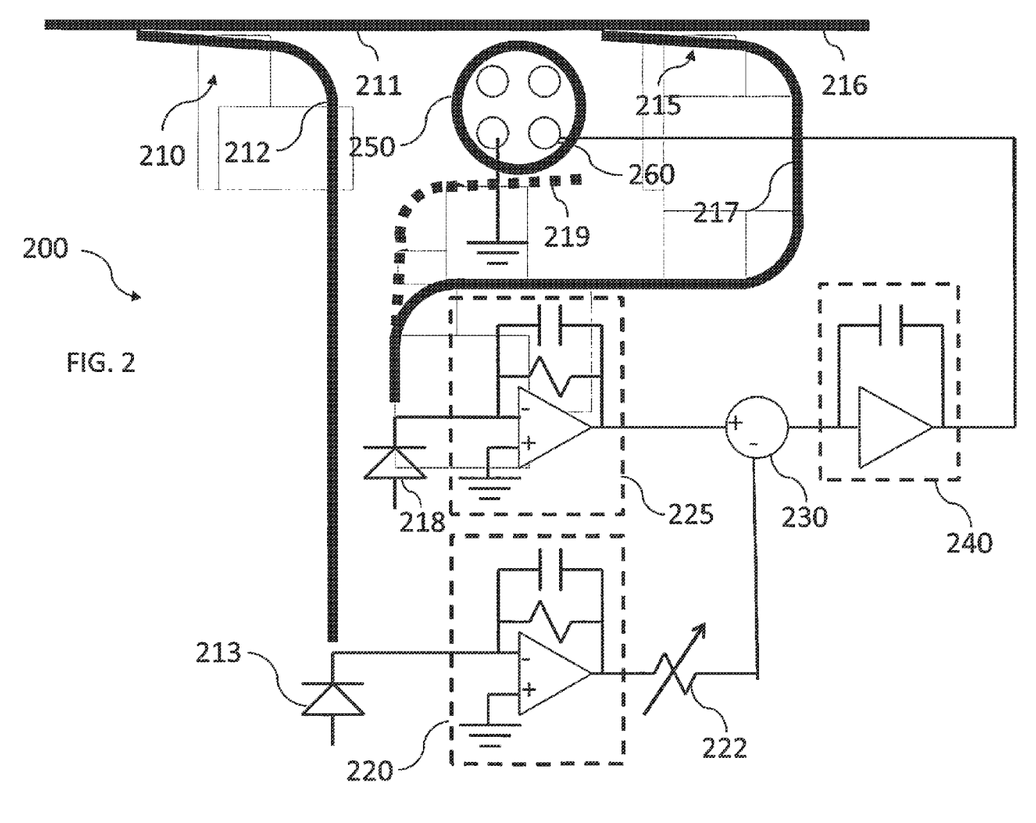
FIG. 2 is a block diagram illustrating an exemplary system for stabilizing a resonant modulator in accordance with aspects of the present invention.

FIG. 2 illustrates an exemplary system 200 for stabilizing a resonant modulator in accordance with aspects of the present invention. System 200 is usable for controlling resonant modulators according to the processes described above in method 100. As a general overview, system 200 includes input structures 210 and 215, low-pass filters 220 and 225, an attenuator 222, a comparator 230, and a control element 240. Additional details of system 200 are described below.

Input structure 210 is configured to receive a portion of the carrier signal. In particular, input structure 210 extracts a portion of the carrier signal that is being input to the resonant modulator 250. Input structure 210 may extract the signal from the input waveguide 211 of the resonant modulator 250.

Preferably, input structure 210 splits a small amount of power (e.g., 1%-10%) from the main signal to be input to resonant modulator 250 and converts it into an electrical signal. In an exemplary embodiment, input structure 210 comprises an evanescent coupling structure. In particular, the evanescent coupling structure may include a waveguide 212 evanescently coupled to the input waveguide 211 of the resonant modulator 250, and additionally coupled to an optical to electrical (O/E) converter 213 such as a suitably biased photodiode or phototransistor that converts the optical signal split from the output waveguide into an electrical signal. Other suitable evanescent coupling structures for use as input structure 210 will be known to one of ordinary skill in the art from the description herein.

Input structure 215 is configured to receive a portion of the modulated carrier signal. In particular, input structure 215 extracts a portion of the carrier signal that has been modulated by resonant modulator 250. Input structure 215 may extract the signal from the output waveguide 216 of the resonant modulator 250.

Preferably, input structure 215 splits a small amount of power (e.g., 1%-10%) from the modulated carrier signal from resonant modulator 250 and converts it into an electrical signal. In an exemplary embodiment, input structure 215 comprises an evanescent coupling structure. In particular, the evanescent coupling structure may include a waveguide 217 evanescently coupled to the output waveguide 216 of the resonant modulator 250, and additionally coupled to an optical to electrical (O/E) converter 218 such as a suitably biased photodiode or phototransistor that converts the optical signal split from the output waveguide into an electrical signal.

In an alternative embodiment, the input structure is a drop port 219 coupled to resonant modulator 250. The drop port is coupled to extract a signal from the body of the resonant modulator in which the optical carrier signal resonates. In an exemplary embodiment, the drop port comprises a waveguide 219 evanescently coupled to the resonant modulator 250, as shown in dotted lines in FIG. 2.

For some applications, it could be preferable to use drop port 219 connected to resonant modulator 250 in place of a coupling structure connected to output waveguide 216. Such applications include, e.g., Dense Wavelength Division Multiplexing (DWDM) applications and others in which multiple optical carrier signals are being transmitted on different frequencies. In such applications, using a drop port 219 connected to resonant modulator 250 as an input structure automatically selects the particular wavelength (or equivalently, the particular optical frequency) being modulated. The use of drop port 219 provides automatic frequency selection because it is coupled directly to resonant modulator 250, and thus can only sample signals that are resonating within the body of modulator 250 (as opposed to other frequency signals which are not modulated by or resonating within modulator 250).

In the multiple frequency applications discussed above, it may be desirable to include additional processing elements coupled to input structure 210 in order to select the wavelength (or equivalently, the frequency) of interest. In an exemplary embodiment, input structure 210 may include a band-pass filter that would reject the wavelengths of other carrier signals extracted from input waveguide 211 by input structure 210. Suitable components for use as the band-pass filter include, for example, one or more Fabry-Perot interferometers coupled between the optical fiber 212 and the O/E converter 213.

Low-pass filters 220 and 225 receive the signals obtained by input structures 210 and 215, respectively. Low-pass filter 220 filters the first portion of the carrier signal to determine an average input power, and low-pass filter 225 filters the second portion of the carrier signal to determine an average output power, as described above with respect to steps 130 and 140.

In a preferred embodiment, low-pass filters 220 and 225 each comprise an operational amplifier (op-amp) connected with a feedback capacitor and resistor, as shown in FIG. 3. The configuration of an op-amp as a low-pass filter will be known to one of ordinary skill in the art. Other suitable processing elements for use as low-pass filters 220 and 225 will be known to one of ordinary skill in the art from the description herein.

Attenuator 222 is coupled to the output of low-pass filter 220. As set forth above, the ratio of the average input power relative to the average output power is adjusted in order to compensate for the inherent loss of power of the carrier signal during modulation of the carrier signal by resonant modulator 250. In an exemplary embodiment, attenuator 222 is a variable resistor that operates to attenuate the average input power signal by a predetermined amount to match the adjusted average input power signal so that it is in a range comparable to the range of the average output power signal when the modulator 250 is operating properly. The appropriate reduction in the average input power can be determined based on the design of the modulator, and more particularly, based on an amount of the inherent power loss caused by the modulator during modulation of the carrier signal. The variable resistor can then be tuned to lower the average input power by the desired amount.

Although the apparatus shown in FIG. 2 uses the variable resistor 222 to adjust the ratio of the average input power to the average output power, it is contemplated that other apparatus may be used. For example, the apparatus may include an optical attenuator, for example, a combination polarizer/analyzer between the optical fiber 212 and the O/E converter 213. Alternatively, the input carrier signal may be attenuated by adjusting the gain of the low-pass filter 220.

Alternatively, instead of attenuating the average input power signal, the apparatus may amplify the average output gain. This may be achieved, for example, by adjusting the gain of the low-pass filter 225.

The relative amplitudes of the input and output carrier signals may also be adjusted by configuring the input structure 210 and the output structure 215 so that the output structure extracts a higher percentage of the signal from the output fiber 216 of the modulator 250 than the input structure 210 extracts from the input fiber 211. Furthermore, it is contemplated that multiple ones of the methods described above may be combined. The goal of these methods is to produce average power signals at the subtractor 230 that are comparable in amplitude so that the integrated difference between these values appropriately drives the integrator 240.

Comparator 230 receives the outputs from attenuator 222 and low-pass filter 225. Comparator 230 compares the adjusted average input power to the average output power, as described above with respect to step 160. Comparator 230 provides an output based on the result of the comparison. The output may indicate that the adjusted average input power and the average output power are equal, or may indicate which average power value is higher or lower than the other. Preferably, example comparator 230 is a subtractor that outputs the difference between the adjusted average input power and the average output power, as shown in FIG. 2.

Control element 240 is configured to operate a heater. As shown in FIG. 2, heater 260 is coupled to modulator 250 and is operable to increase the temperature of modulator 250. Heater 260 may be, for example, a resistive heater. Control element 240 operates heater 260 based on the difference between the adjusted average input power and the average output power. In particular, control element 240 can be connected to receive the output (i.e., the difference) provided by subtractor 230.

Control element 240 operates heater 260 based on the difference between the signals from filter 225 and attenuator 222. In an exemplary embodiment, control element 240 is an integrator. The integrator is configured to integrate the actual difference between the adjusted average input power and the average output power to create a control signal for heater 260. As shown in FIG. 2, the output of the integrator is connected as a control input to heater 260. Other possible forms for control element 240 will be apparent to one of ordinary skill in the art from the description herein.

Although the control element is shown as an analog integrator, it is contemplated that it may be implemented as a digital integrator. For example, in the apparatus shown in FIG. 2, the subtractor 230 may be replaced by a comparator having a digital output. The example comparator produces a logical high signal when the average output power signal provided by the low-pass filter 225 exceeds the adjusted average input power signal provided by the attenuator 222. The output signal of the comparator is applied to an up-down counter that performs the function of the integrator 240. When the average output power is greater than the average input power, the counter increments its count value. When the average output power is less than the average input power, the counter decrements its count value. The apparatus may further include a digital-to-analog converter that provides an analog signal to the heater 260 to control the temperature of the resonant modulator 250. Alternatively, the apparatus may include a digitally-controlled heater and the output signal of the up/down counter may be applied directly to digital inputs of the heater.

It will be understood from the description herein that other various portions of system 200 could be designed to operate as analog or digital components. For example, the comparator 230 and attenuator 222 could also be digital, with Digital-to-Analog converters positioned to process the signals from filters 220 and 225. Alternatively, the filters themselves could be low-pass Finite-Impulse-Response (FIR) filters having the same cutoff frequency as described above with respect to filters 220 and 225. Other possible substitutions of analog or digital components will be apparent to one of ordinary skill in the art from the description herein.

FIGS. 3A-3D are graphs illustrating the effect that changes in temperature have on signal transmission for an exemplary resonant modulator in accordance with aspects of the present invention. As shown in the drawings, line 302 represents the frequency of an exemplary carrier signal (such as a laser) to be modulated by an exemplary resonant modulator. Curves 304 and 306 show the transmission factors of the exemplary resonant modulator for different ranges of frequencies (relative to the frequency of the exemplary carrier signal 302) for two different values of applied voltage to the modulator that represent the values of logic 1 and logic 0 where they cross line 302. Curve 308 shows the differential transmission between curves 304 and 306 of the exemplary modulator, and curve 310 shows the average transmission of curves 304 and 306.

FIG. 3A shows the above curves in a state in which the exemplary modulator has suffered from temperature drift changing the resonant frequency of the modulator. As shown in FIG. 3A, the transmission of the exemplary resonator at the frequency of the exemplary carrier signal is high, as indicated by the intersection of line 302 and curve 304, resulting in little attenuation and ineffective modulation by the resonant modulator as indicated by the low value of the differential transmission, shown where curve 308 intersects at line 302. In FIGS. 3B and 3C, the temperature of the modulator has begun to be stabilized by the processes set forth above with respect to method 100 and system 200. As part of this stabilization, the average transmission curve 310 has begun to shift back toward the frequency of the exemplary carrier signal 302 and the differential transmission (shown by curve 308) has risen. In FIG. 3D, the temperature of the modulator has been stabilized in a range at which a desired attenuation of the exemplary carrier signal is achieved (as shown by the intersection of curve 310 with line 302). Additionally, in FIG. 3D, the differential transmission curve 308 is nearly maximized, showing that only the exemplary carrier signal (and not other optical carrier signals) are being modulated by the exemplary resonant modulator.

Although the invention is illustrated and described herein with reference to specific embodiments, the invention is not intended to be limited to the details shown. Rather, various modifications may be made in the details within the scope and range of equivalents of the claims and without departing from the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for stabilizing a resonant modulator comprising the steps of:
   receiving a first portion of a carrier signal to be input to the resonant modulator;
   receiving a second portion of the carrier signal after the carrier signal has been modulated by the resonant modulator;
   determining an average input power from the first portion of the carrier signal input to the resonant modulator;
   determining an average output power from the second portion of the carrier signal output from the resonant modulator;
   obtaining an adjustment of the average input power relative to the average output power;
   comparing the average input power and average output power subject to the adjustment of the average input power relative to the average output power; and
   operating a heater coupled to the resonant modulator based on the comparison;
   wherein operating the heater includes changing a voltage applied to the heater in response to a result of the comparison.

2. The method of claim 1, wherein:
   the obtaining an adjustment comprises adjusting at least one of the average input power or the average output power; and
   the comparing step includes comparing the adjusted one of the average input power or average output power to the other one of the average input power or average output power.

3. The method of claim 2, wherein:
   the adjusting step includes attenuating the average input power to produce an adjusted average input power; and
   operating the heater includes increasing a voltage applied to the heater when the average output power is greater than the adjusted average input power.

4. The method of claim 3, wherein the comparing step comprises:
   determining a difference between the adjusted average input power and the average output power.

5. The method of claim 4, wherein the operating step comprises:
   integrating the difference between the adjusted average input power and the average output power to obtain a control signal for the heater; and
   applying the control signal to the heater.

6. The method of claim 2, wherein the adjusting comprises:
   reducing the average input power by a predetermined percent, the predetermined percent based on a design of the resonant modulator.

7. The method of claim 1, wherein the determining steps comprise:
   filtering the first portion of the carrier signal with a first low-pass filter to obtain the average input power; and
   filtering the second portion of the carrier signal with a second low-pass filter to obtain the average output power.

8. The method of claim 1, wherein the receiving the second portion of the carrier signal includes receiving the second portion of the carrier signal via an optical fiber evanescently coupled to a carrier optical fiber coupled to the resonant modulator.

9. The method of claim 1, wherein the receiving the second portion of the carrier signal includes receiving the second portion of the carrier signal via a drop port evanescently coupled to the resonant modulator.

10. A system for stabilizing a resonant modulator comprising:
   a first input structure configured to extract a first portion of a carrier signal to be input to the resonant modulator;
   a second input structure configured to extract a second portion of the carrier signal after the carrier signal has been modulated by the resonant modulator;
   one or more processing elements configured to determine an average input power from the first portion of the carrier signal and an average output power from the second portion of the carrier signal and to obtain an adjustment of the average input power relative to the average output power;
   a comparator configured to compare the average input power and the average output power subject to the adjustment of the average input power relative to the average output power; and
   a control element configured to operate a heater coupled to the resonant modulator based on the comparison of the average input power and the average output power, wherein operating the heater includes changing a voltage applied to the heater in response to an output of the comparator.

11. The system of claim 10, wherein the first input structure comprises an evanescent coupling structure positioned adjacent an optical input waveguide of the modulator, and the second input structure comprises an evanescent coupling structure positioned adjacent an optical output waveguide of the modulator.

12. The system of claim 10, wherein the second input structure comprises a drop port coupled to the resonant modulator.

13. The system of claim 10, wherein the plurality of processing elements include:
   a first low-pass filter configured to filter the first portion of the carrier signal to obtain the average input power; and
   a second low-pass filter configured to filter the second portion of the carrier signal to obtain the average output power.

14. The system of claim 13, wherein the first and second low-pass filters have a cutoff frequency in a range from 10 KHz to 50 KHz.

15. The system of claim 13, further comprising an attenuator configured to adjust the average input power to be in a range that is comparable to a range of the average output power and to apply the adjusted average input power to the comparator for comparison with the average output power.

16. The system of claim 15, wherein the attenuator comprises a variable resistor connected to the first low-pass filter to lower the average input power by a predetermined percent.

17. The system of claim 10, wherein the comparator is configured to determine a difference between the average input power and the average output power.

18. The system of claim 17, wherein the control element comprises an integrator configured to integrate the difference between the average input power and the average output power.

19. The system of claim 18, wherein an output of the integrator is connected as a control input to the heater.

20. The system of claim 10, further comprising the heater and the resonant modulator.

* * * * *